(12) United States Patent
Song et al.

(10) Patent No.: US 11,522,586 B2
(45) Date of Patent: Dec. 6, 2022

(54) APPARATUSES AND METHODS FOR NON-LINEAR PRECODING

(71) Applicant: NOKIA TECHNOLOGIES OY, Espoo (FI)

(72) Inventors: Nuan Song, Shanghai (CN); Eugene Visotsky, Buffalo Grove, IL (US); Frederick Vook, Schaumburg, IL (US); Mihai Enescu, Espoo (FI)

(73) Assignee: NOKIA TECHNOLOGIES OY, Espoo (FI)

(*) Notice: Subject to any disclaimer, the term of this patent is extended or adjusted under 35 U.S.C. 154(b) by 3 days.

(21) Appl. No.: 16/961,572

(22) PCT Filed: Jan. 18, 2018

(86) PCT No.: PCT/CN2018/073282
§ 371 (c)(1),
(2) Date: Jul. 10, 2020

(87) PCT Pub. No.: WO2019/140610
PCT Pub. Date: Jul. 25, 2019

(65) Prior Publication Data
US 2021/0067215 A1   Mar. 4, 2021

(51) Int. Cl.
*H04W 4/00* (2018.01)
*H04B 7/0456* (2017.01)
(Continued)

(52) U.S. Cl.
CPC ......... *H04B 7/0486* (2013.01); *H04B 7/0452* (2013.01); *H04B 7/0626* (2013.01);
(Continued)

(58) Field of Classification Search
CPC .. H04B 7/0486; H04B 7/0452; H04B 7/0626; H04B 7/0632; H04B 7/0639;
(Continued)

(56) References Cited

U.S. PATENT DOCUMENTS 9,660,707 B2 * 5/2017 Yan .................... H04B 7/0452
9,887,736 B2 * 2/2018 Maes .................... H04L 5/143
(Continued)

FOREIGN PATENT DOCUMENTS

| CN | 103503324 A | 1/2014 |
|---|---|---|
| CN | 105052048 A | 11/2015 |

(Continued)

OTHER PUBLICATIONS

Extended European Search Report issued in corresponding European Patent Application No. 18901750.2 dated Jul. 26, 2021.
(Continued)

*Primary Examiner* — Helene E Tayong
(74) *Attorney, Agent, or Firm* — Squire Patton Boggs (US) LLP

(57) ABSTRACT

Systems, methods, apparatuses, and computer program products for non-linear precoding are provided. One method may include combining, by a network node, of linear and non-linear precoding, for example based on specific channel state information acquisition from at least one user equipment, and generating two types of demodulation reference signals for the concatenated linear and non-linear precoding. The method may include multiplexing, by the network node, the two types of demodulation reference signals with data. A first of the two types of demodulation reference signals may be linearly precoded with one linear precoding matrix from a first-stage linear precoder, and another one of the two types may be linearly precoded with both the first-stage linear precoder and a feedforward filter in a second-stage non-linear precoder from the concatenation of linear and nonlinear precoders.

14 Claims, 6 Drawing Sheets

(51) Int. Cl.
*H04B 7/0452* (2017.01)
*H04B 7/06* (2006.01)
*H04L 5/00* (2006.01)
(52) U.S. Cl.
CPC ......... *H04B 7/0632* (2013.01); *H04B 7/0639* (2013.01); *H04L 5/0051* (2013.01)
(58) Field of Classification Search
CPC ...... H04B 7/046; H04B 7/063; H04B 7/0689; H04L 5/0051; H04L 5/0057
USPC .......................................................... 370/329
See application file for complete search history.

(56) References Cited

U.S. PATENT DOCUMENTS

| | | | | |
|---|---|---|---|---|
| 2013/0051490 A1* | 2/2013 | Gupta | ................... | H04L 1/0031 375/296 |
| 2013/0064150 A1 | 3/2013 | Hirata et al. | | |
| 2016/0254894 A1* | 9/2016 | Tomeba | ................ | H04L 1/0026 370/329 |
| 2017/0294940 A1* | 10/2017 | Nuzman | .............. | H04M 11/062 |

FOREIGN PATENT DOCUMENTS

| | | |
|---|---|---|
| CN | 106453167 A | 2/2017 |
| CN | 106982078 A | 7/2017 |
| CN | 106992805 A | 7/2017 |
| EP | 2 219 316 A1 | 8/2010 |
| EP | 2800283 A1 | 11/2014 |
| EP | 2919392 A1 | 9/2015 |

OTHER PUBLICATIONS

Mitsubishi Electric: "Summary of analysis of nonlinear precoding schemes for NR", 3rd Generation Partnership Project (3GPP), 3GPP TSG RAN WG1 Meeting #88bis, R1-1705817, Apr. 2, 2017, XP051243929.
Nokia et al.: "On MU MIMO non-linear precoding in NR", 3rd Generation Partnership Project (3GPP), 3GPP TSG RAN WG1 #88 Meeting, R1-1703187, Feb. 12, 2017, XP051210323.
Mitsubishi Electric: "Nonlinear precoding schemes for NR MU-MIMO", 3rd Generation Partnership Project (3GPP), 3GPP TSG-RAN WG1 #86, R1-166574, Aug. 21, 2016, XP051140280.
NTT Docomo: "Discussion on Non-linear Precoding Scheme for NR", 3rd Generation Partnership Project (3GPP), 3GPP TSG Ran WG1 Meeting #87, R1-1700594, Jan. 16, 2017, XP051208121.
International Search Report and Written Opinion dated Jun. 29, 2018 corresponding to International Patent Application No. PCT/CN2018/073282.
Chinese Office Action issued in corresponding Chinese Patent Application No. 201880087017.1 dated Aug. 15, 2022.

* cited by examiner

APPARATUSES AND METHODS FOR NON-LINEAR PRECODING

FIELD

Some example embodiments may generally relate to mobile or wireless telecommunication systems. For instance, various example embodiments may relate to non-linear precoding procedures in such telecommunication systems.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or fifth generation (5G) radio access technology or new radio (NR) access technology. Fifth generation (5G) or new radio (NR) wireless systems refer to the next generation (NG) of radio systems and network architecture. It is estimated that NR will provide bitrates on the order of 10-20 Gbit/s or higher, and will support at least enhanced mobile broadband (eMBB) and ultra-reliable low-latency-communication (URLLC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the nodes that can provide radio access functionality to a user equipment (i.e., similar to Node B in E-UTRAN or eNB in LTE) may be referred to as a next generation or 5G Node B (gNB).

SUMMARY

One embodiment is directed to a method that may include concatenating, by a network node, of linear and non-linear precoding, and generating two types of demodulation reference signals for the concatenated linear and non-linear precoding. One of the two types may be linearly precoded with one linear precoding matrix from a first-stage linear precoder, used for linear receive combining, and another one of the two types may be linearly precoded with both the first-stage linear precoder and a feedforward filter in a second-stage non-linear precoder from the concatenation of linear and nonlinear precoders, used for scaling and phase de-rotation of the non-linearly precoded data. The method may then include multiplexing, by the network node, the two types of demodulation reference signals with data.

Another embodiment is directed to an apparatus including at least one processor and at least one memory comprising computer program code. The at least one memory and computer program code configured, with the at least one processor, to cause the apparatus at least to concatenate linear and non-linear precoding, and generate two types of demodulation reference signals for the concatenated linear and non-linear precoding. One of the two types may be linearly precoded with one linear precoding matrix from a first-stage linear precoder, used for linear receive combining, and another one of the two types may be linearly precoded with both the first-stage linear precoder and a feedforward filter in a second-stage non-linear precoder from the concatenation of linear and nonlinear precoders, used for scaling and phase de-rotation of the non-linearly precoded data. The at least one memory and computer program code may also be configured, with the at least one processor, to cause the apparatus at least to multiplex the two types of demodulation reference signals with data.

Another embodiment is directed to an apparatus that may include concatenating means for concatenating linear and non-linear precoding, and generating means for generating two types of demodulation reference signals for the concatenated linear and non-linear precoding. One of the two types may be linearly precoded with one linear precoding matrix from a first-stage linear precoder, used for linear receive combining, and another one of the two types may be linearly precoded with both the first-stage linear precoder and a feedforward filter in a second-stage non-linear precoder from the concatenation of linear and nonlinear precoders, used for scaling and phase de-rotation of the non-linearly precoded data. The apparatus may also include multiplexing means for multiplexing the two types of demodulation reference signals with data.

Another embodiment is directed to a non-transitory computer readable medium comprising program instructions stored thereon for performing the following: concatenating linear and non-linear precoding, generating two types of demodulation reference signals for the concatenated linear and non-linear precoding, where one of the two types is linearly precoded with one linear precoding matrix from a first-stage linear precoder, used for linear receive combining, and another one of the two types is linearly precoded with both the first-stage linear precoder and a feedforward filter in a second-stage non-linear precoder from the concatenation of linear and nonlinear precoders, used for scaling and phase de-rotation of the non-linearly precoded data, and multiplexing the two types of demodulation reference signals with data.

Another embodiment is directed to a method that may include supporting a network node in specific channel state information acquisition to generate two types of demodulation reference signals, receiving, from the network node, dual demodulation reference signals comprising the two types of demodulation reference signals and data, estimating two equivalent channels using the dual demodulation reference signals and demodulating the data, and concatenating, by a user equipment, linear and non-linear receivers based on the dual demodulation reference signals, to demodulate the data.

Another embodiment is directed to an apparatus including at least one processor and at least one memory comprising computer program code. The at least one memory and computer program code configured, with the at least one processor, to cause the apparatus at least to support a network node in specific channel state information acquisition to generate two types of demodulation reference signals, receive, from the network node, dual demodulation reference signals comprising the two types of demodulation reference signals and data, estimate two equivalent channels using the dual demodulation reference signals and demodulating the data, and concatenate linear and non-linear receivers based on the dual demodulation reference signals, to demodulate the data.

Another embodiment is directed to an apparatus including supporting means for supporting a network node in specific channel state information acquisition to generate two types of demodulation reference signals, receiving means for receiving, from the network node, dual demodulation reference signals comprising the two types of demodulation reference signals and data, estimating means for estimating two equivalent channels using the dual demodulation reference signals and demodulating the data, and concatenating means for concatenating linear and non-linear receivers based on the dual demodulation reference signals, to demodulate the data.

Another embodiment is directed to a non-transitory computer readable medium comprising program instructions stored thereon for performing the following: supporting a network node in specific channel state information acquisition to generate two types of demodulation reference signals, receiving dual demodulation reference signals comprising the two types of demodulation reference signals and data, estimating two equivalent channels using the dual demodulation reference signals and demodulating the data, and concatenating linear and non-linear receivers based on the dual demodulation reference signals, to demodulate the data.

BRIEF DESCRIPTION OF THE DRAWINGS

For proper understanding of the invention, reference should be made to the accompanying drawings, wherein.

DETAILED DESCRIPTION

Figure 1:
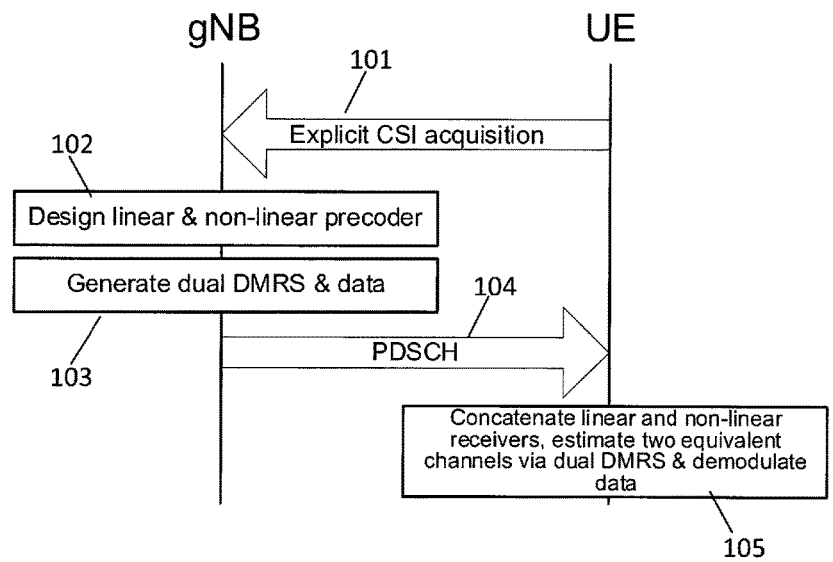
FIG. 1 illustrates an example signaling diagram of a non-linear precoding procedure, according to an embodiment.

It will be readily understood that the components of the invention, as generally described and illustrated in the figures herein, may be arranged and designed in a wide variety of different configurations. Thus, the following detailed description of the embodiments of systems, methods, apparatuses, and computer program products for non-linear precoding, as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles, teachings and embodiments of this invention, and not in limitation thereof.

Certain embodiments described herein may relate to a new radio (NR) multi-user (MU) multiple-input multiple-output (MIMO) communication system. For instance, some example embodiments may be directed to efficient non-linear precoding procedures for performance enhancement in NR MIMO phase II.

Non-linear precoding has been identified as a promising candidate for NR. With full channel station information (CSI) at the transmitter side, a "Dirty-Paper" Coding (DPC) technique that relies on a pre-subtraction of the non-causally known interference can achieve the maximum sum rate of the system and provide the maximum diversity order. Tomlinson-Harashima Precoding (THP) is a simplified and efficient version of DPC, which is less computationally demanding and thus more attractive for practical implementation. Non-linear precoding, such as THP, is able to provide a significantly enhanced system performance as compared to linear precoding, especially for correlated channels where the subspaces of user equipment (UEs) are overlapped. However, there are several technical challenges to the implementation of non-linear precoding.

In NR MIMO systems, both the gNB and UEs may be mounted with more antennas than those in LTE systems, especially at the gNB side, where a large antenna array is usually applied. This may lead to a prohibitively high complexity and overwhelming overhead to implement non-linear precoding.

Additionally, UEs should have the capability of demodulating the non-linearly precoded data, e.g., a modulo operation and a modified calculation of the receive weights for different streams are required at the UEs. Also, non-linear processing at the transmitter leads to a different demodulation reference signal (DMRS) structure, as the receiver cannot estimate the channel directly by simply relying on the legacy DMRS used with linear precoding.

Non-linear precoding is more sensitive to CSI errors than linear precoding, since linear precoding is based on the spatial signal subspace calculations. Whereas THP precoding is effectively a non-causal interference pre-subtraction scheme.

In view of the above, certain embodiments provide methods for efficiently carrying out non-linear precoding in NR MU MIMO systems and, therefore, may provide solutions to at least the above-noted problems.

Various example embodiments may be directed to an efficient non-linear precoding procedure. For example, as will be discussed in detail below, one embodiment may provide combined or concatenated linear and non-linear precoding, based on explicit CSI feedback, for the precoding design and a dual DMRS structure for demodulation of the data that undergo both non-linear and linear precoding.

FIG. 1 illustrates an example signaling diagram of a non-linear precoding procedure, according to an embodiment. According to the example embodiment of FIG. 1, an explicit CSI acquisition procedure may be provided to achieve both the linear and non-linear precoding design. As illustrated in the example of FIG. 1, the UE may provide explicit CSI feedback to the gNB at 101. In certain embodiments, the CSI may be a combination of channel quality indicator (CQI), rank indicator (RI), and explicit transmit channel covariance. In other embodiments, the CSI may be the combination of CQI, RI, precoding matrix indicator (PMI), and explicit effective/beamformed to channel. In yet another embodiment, the CSI may include CQI, RI, PMI along with the CSI estimated at the gNB via transmit-receive beamformed uplink sounding based on reciprocity.

At 102, the gNB may design or calculate a linear and non-linear precoder and, at 103, the gNB may generate dual DMRS (e.g., DMRS1 and DMRS2) and data. In an embodiment, the gNB may, at 104, use PDSCH to transmit at least the two generated DMRS to the UE. According to certain embodiments, the UE may then, at 105, estimate two equivalent channels via the received dual DMRS and demodulate the data. It should be noted that, while FIG. 1 illustrates signaling between nodes labeled as a gNB and UE, the gNB may also be a base station, node B, eNB, or any other network node capable of providing radio access functionality, and the UE may be a mobile device, IoT device, or any other device capable of communication with a wireless or wired communication network.

Thus, according to certain embodiments, two types of DMRS may be multiplexed with data, where one of the two DMRS may be used for linear receive combining and the other of the two DMRS may be used for scaling and phase de-rotation of the non-linearly precoded data. It is noted that, for legacy beamformed systems such as LTE, and in NR, a single DMRS structure may be defined for receive processing.

Figure 2:
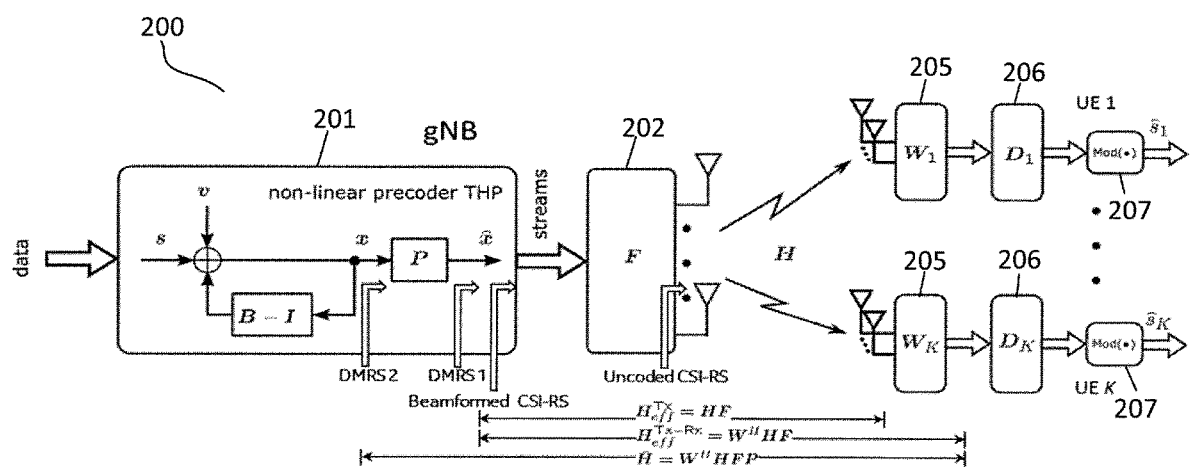
FIG. 2 illustrates a block diagram of a non-linear precoding system, according to an embodiment.

FIG. 2 illustrates a block diagram of a non-linear precoding system 200, according to an embodiment. In one example embodiment, system 200 may be a THP-based non-linear precoding system for MU MIMO. In this example embodiment, there may be K UEs in the system and each UE may have $M_{R_k}$ antennas. In addition, in one example, there may be $M_T$ antennas at the gNB and in total $r=\Sigma_{k=1}^{K} r_k$ streams, where the gNB may transmit $r_k$ streams to the UE k. According to one embodiment, precoding at the gNB side may include a linear beamformer 202, $F=[F_1, F_2, \ldots, F_K] \in \mathbb{C}^{M_T \times r}$ and a non-linear THP precoder 201 to suppress inter-stream and inter-user interference. At the UE side, the receive processing may include a linear combiner 205, $W_k \in \mathbb{C}^{M_{R_k} \times r_k}$, a weighting process 206, $D_k \in \mathbb{C}^{r_L \times r_L}$, and a modulo operation 207, Mod (•), before the demodulation and decoding. In one example, the channel $H=[H_1^T, H_2^T, \ldots, H_K^T]^T \in \mathbb{C}^{M_R \times M_T}$ is the full CSI, where $M_R = \Sigma_{k=1}^{K} M_{R_k}$ is the total number of receive antennas from all UEs.

Referring again to the example of FIG. 1 introduced above, a non-linear precoding procedure may include an explicit CSI acquisition stage and linear & non-linear precoding stage for the downlink data. In one embodiment, the explicit CSI feedback 101 acquired by the gNB, from UE(s), may also include information on the UE(s) capability of demodulating non-linearly precoded data. According to certain embodiments, the gNB may further determine the precoding type (e.g., in the MU MIMO with non-linear precoding mode) and may schedule UE(s) for non-linear precoding. In an embodiment, the gNB may also calculate the linear precoding matrix. As discussed above, the acquired CSI may include: (1) the combination of CQI, RI, and explicit transmit channel covariance; (2) the combination of CQI, RI, PMI, and explicit effective/beamformed channel, and/or (3) obtained via a CSI reporting including CQI, RI, PMI along with the CSI directly estimated via transmit-receive beamformed uplink sounding based on reciprocity. According to one example embodiment, the gNB may use PDCCH transmission 104 to include a specific downlink indicator to inform the UEs that they are scheduled to be non-linearly precoded.

According to certain embodiments, different types of CSI may be defined in the system used for precoding. In some example embodiments, the full CSI, $H \in \mathbb{C}^{M_R \times M_T}$, may be used to obtain the linear precoding and combining. In an embodiment, in order to perform THP non-linear precoding, Tx-Rx effective/beamformed channel, $H_{eff}^{Tx-Rx} \in \mathbb{C}^{r \times r}$, may be obtained according to the following equation:

$$H_{eff}^{Tx-Rx} = W^H HF = \begin{bmatrix} W_1^H H_1 F_1 & W_1^H H_1 F_2 & \ldots & W_1^H H_1 F_K \\ W_2^H H_2 F_1 & W_2^H H_2 F_2 & \ldots & W_2^H H_2 F_K \\ \vdots & \vdots & \ddots & \vdots \\ W_K^H H_K F_1 & W_K H_K F_2 & \ldots & W_K^H H_K F_K \end{bmatrix}. \quad (1)$$

In one example embodiment, the receive signal for each UE after linear combining may be obtained according to the following equation:

$$\bar{y}_k = W_k^H H_k F_k \hat{x}_k + \sum_{i=1, i \neq k}^{K} W_k^H H_k F_i \hat{x}_i + \bar{n}_k \in \mathbb{C}^{r_k}. \quad (2)$$

Assuming that a Maximal Ratio Combining (MRC) receiver is applied based on the Tx effective/beamformed channel $H_{eff}^{Tx} = H_k F_k \mathbb{C}$ at the UE side, also namely the equivalent channel 1 (ECH1) for data demodulation, results in the following:

$$W_k = \frac{H_k F_k}{\|H_k F_k\|_F}, \quad (3)$$

and accordingly each block entry of Tx-Rx effective CSI can be represented by the following:

$$H_{eff}^{Tx-Rx}(i, j) = \frac{F_i^H H_i^H H_i F_j}{\|H_i F_i\|_F} \triangleq \frac{F_i^H R_i^T F_j}{\|F_i^H R_i^T F_i\|_F}, \quad (4)$$

where $R_i^T = H_i^H H_i \in \square^{M_T \times M_T}$ corresponds to the transmit covariance of the channel at the gNB side and $\|\bullet\|$ denotes the Frobenius norm of a matrix.

In an embodiment, the THP precoding may include a feedback loop depending on B and a linear feedforward filter P. The non-linear precoded equivalent channel may be defined as: $\bar{H} = W^H HFP$, namely the equivalent channel 2 (ECH2) for demodulation.

Figure 3:
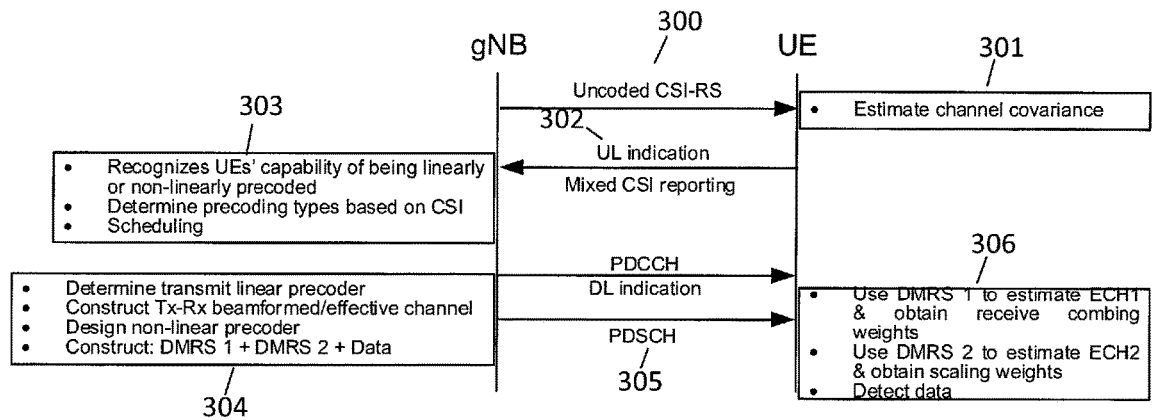
FIG. 3 illustrates an example signaling diagram depicting an implementation procedure of non-linear precoding according for a first case, according to an embodiment.
Figure 4:
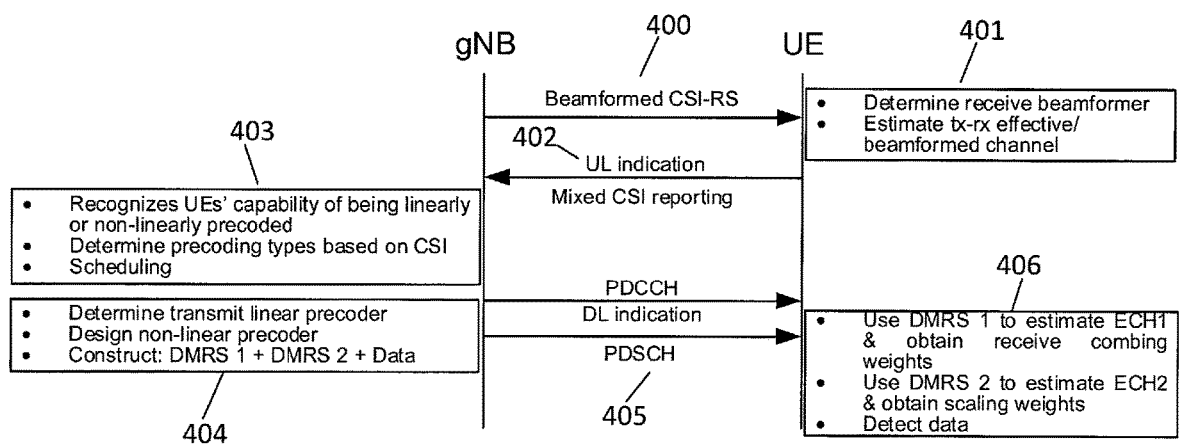
FIG. 4 illustrates an example signaling diagram depicting an implementation procedure of non-linear precoding according for a second case, according to an embodiment.
Figure 5:
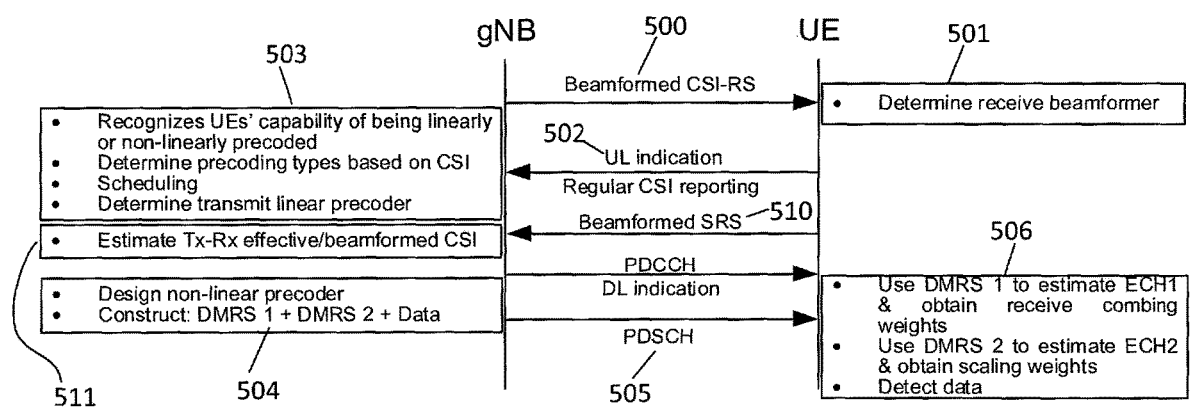
FIG. 5 illustrates an example signaling diagram depicting an implementation procedure of non-linear precoding according for a third case, according to an embodiment.

Various example embodiments may provide at least three different design cases for the explicit CSI acquisition. FIGS. 3, 4 and 5 respectively illustrate three example cases for efficiently acquiring explicit CSI in a single stage, according to certain embodiments. It is note that these are only three possible examples, and additional examples may be applicable according to other embodiments.

FIG. 3 illustrates an example signaling diagram depicting an implementation procedure of non-linear precoding according to a first case (which may be referred to herein as case a). In this example of case a, explicit CSI feedback with respect to transmit covariance of the channel $R_i^T$ may be provided. As illustrated in FIG. 3, at 301, one or more UE(s) are able to measure or estimate the transmit covariance $R_i^T$ from the unprecoded CSI-RS sent by the gNB at 300. Each of the UE(s) may also report to the gNB, at 302, its preferred RI and CQI. Additionally, at 302, the UE(s) may also feedback the explicit CSI $R_i^T$ to the gNB. The gNB may, at 303, recognize the UE(s) capability of being linearly or non-linearly precoded, determine precoding types based on CSI, and carry out scheduling. The gNB may then, at 304, determine the linear precoding matrix $F=[F_1, F_2, \ldots, F_K]$ based on $R_i^T$ for the scheduled UE(s), construct the TX-RX effective/beamformed channel $H_{eff}^{Tx-Rx}$ for example according to equation 4 shown above, and generate dual DMRS (e.g., DMRS1 and DMRS2) and data. The gNB may, at 305, use PDSCH to transmit at least the two generated DMRS to the UE(s). In an embodiment, the gNB may also transmit a specific downlink indicator to inform the UE that it is scheduled to be non-linearly precoded. At 306, the UE may use the dual DMRS received from the gNB to estimate the equivalent channels (including ECH1 and ECH2), obtain receive combining weights and scaling weights, and detect the data.

FIG. 4 illustrates an example signaling diagram depicting an implementation procedure of non-linear precoding according to a second case (which may be referred to herein as case b). In this example of case b, explicit is CSI feedback with respect to the Tx-Rx effective/beamformed channel, $H_{eff}^{Tx-Rx}$, may be provided. As illustrated in the example of FIG. 4, the gNB may send, at 400, downlink beamformed CSI-RS to UE(s). Each of the UE(s) may, at 401, determine the receive beamformer, estimate the Tx effective/beamformed channel, $H_{eff}^{Tx-Rx}=H_k F_k$, and evaluate its receive combining $W_k$ assuming, for example, the MRC receiver in equation 3. On the one side, at 402, each of the UE(s) may feedback the CSI, including CQI, RI, PMI, where PMI is used for the determination of the linear precoding matrix $F=[F_1, F_2, \ldots, F_K]$ for the scheduled UE(s). Furthermore, in an embodiment, each of the UE(s) may also feedback explicit CSI $H_{eff}^{Tx-Rx}$ based on the corresponding PMI and its assumed receive combining $W_k$. The gNB may, at 403, recognize the UE(s) capability of being linearly or non-linearly precoded, determine precoding types based on CSI, and carry out scheduling. The gNB may then, at 404, determine the linear precoding matrix $F=[F_1, F_2, \ldots, F_K]$ based on $R_i^T$ for the scheduled UE(s), and generate dual DMRS (e.g., DMRS1 and DMRS2) and data. The gNB may, at 405, use PDSCH to transmit at least the two generated DMRS to the UE(s). In an embodiment, the gNB may also transmit a specific downlink indicator to inform the UE that it is scheduled to be non-linearly precoded. At 406, the UE may use the dual DMRS received from the gNB to estimate the equivalent channels (including ECH1 and ECH2), obtain receive combining weights and scaling weights, and detect the data.

FIG. 5 illustrates an example signaling diagram depicting an implementation procedure of non-linear precoding according to a third case (which may be referred to herein as case c). In this example of case c, reciprocity-based CSI acquisition with respect to the Tx-Rx effective/beamformed channel, $H_{eff}^{Tx-Rx}$, is provided. As illustrated in the example of FIG. 5, at 500, the gNB may send downlink beamformed CSI-RS to one or more UEs. The UE k may estimate or determine, at 501, its Tx effective/beamformed channel, $H_{eff}^{Tx-Rx}=H_k F_k$, and evaluate its receive combining $W_k$ assuming, for example, MRC receiver. Meanwhile, the gNB may also indicate, to each of the UE(s), its souding reference signal (SRS) resource(s). In one embodiment, it may be assumed that there are an equal number of transmit and receive antennas at the UE side. According to certain embodiments, each of the UE(s) may, at 502, regularly feedback CQI, RI, and PMI, where PMI is used for the determination of the linear precoding matrix $F=[F_1, F_2, \ldots, F_K]$ for the scheduled UE(s). The gNB may, at 503, recognize the UE(s) capability of being linearly or non-linearly precoded, determine precoding types based on CSI, carry out scheduling, and determine the Tx linear precoder.

In an embodiment, each of the UE(s) may also send, at 510, beamformed SRS using $W_k^T$ as the transmit beamformer in the allocated resource(s) assuming Tx-Rx duality and reciprocity holds. The gNB may apply $F_k^T$ as the receive beamformer to receive beamformed SRS and, at 511, estimate the Tx-RX effective/beamformed channel $H_{eff}^{Tx-Rx}$ directly. The gNB may then, at 504, design the non-linear precoder, and generate dual DMRS (e.g., DMRS1 and DMRS2) and data. The gNB may, at 505, use PDSCH to transmit at least the two generated DMRS to the UE(s). In an embodiment, the gNB may also transmit a specific downlink indicator to inform the UE that it is scheduled to be non-linearly precoded. At 506, the UE may use the dual DMRS received from the gNB to estimate the equivalent channels (including ECH1 and ECH2), obtain receive combining weights and scaling weights, and detect the data.

According to various example embodiments, based on the CSI $H_{eff}^{Tx-Rx}$, a gNB may preform THP-based non-linear precoding as discussed in the following. A linear representation model of the THP non-linear precoding is illustrated in block 201 of FIG. 2 discussed above. In an embodiment, the modulo operation inside the feedback loop may be removed and equivalently a vector perturbation v may be added to the original data $s \in \mathbb{C}^r$ before the loop, where each element $v_i$ is $v_i \in \{2\sqrt{M} \cdot (v_I + jv_Q) | v_I, v_Q \in \mathbb{Z}\}$ for M-ary QAM modulated signals. By calculating an LQ decomposition on the channel $H_{eff}^{Tx-Rx}$, the following equation is given:

$$H_{eff}^{Tx-Rx} = LQ, \tag{5}$$

where L is a lower triangular matrix and Q is a unitary matrix. The feedforward and feedback filters for the THP algorithm may be obtained as $P=Q^H$ and $$B = DL \tag{7}$$

$$D = \text{diag}\{L^{-1}(1,1), \ldots, L^{-1}(r,r)\},$$

respectively, where $L(i,i)$ is the i-th diagonal element of the matrix L. Then the signal output of the loop may be written as $x \in \mathbb{C}^r$, where each element is expressed by:

$$x_i = s_i + v_i - \sum_{l=1}^{i-1} B(i,l) x_l, \tag{8}$$

$$i = 1, \ldots, r.$$

As discussed herein, according to certain embodiments, a gNB may construct a PDSCH transmission including two linearly precoded DMRS (e.g., DMRS1, DMRS2) and may perform both linear precoding & non-linear interference pre-subtraction of the data, followed by the modular operation. In an embodiment, the gNB may then send the resulting transmit signal to the UE(s). As depicted in the example of FIG. 2, a UE may firstly measure the Tx effective/beamformed channel $H_{\mathit{eff}}^{Tx-Rx} = H_k F_k$ i.e., ECH1, via DMRS1 and compute the linear combining $W_k$ (block 205). Then, the UE may estimate the non-linearly precoded equivalent channel $\overline{H}_k = H_{k,\mathit{eff}}^{Tx-Rx} P_k$, i.e., ECH2, via DMRS2 and compute the weighting $D_k$ (block 206).

According to some example embodiments, to correctly demodulate the data that undergoes both linear and non-linear precoding, two-step UE-specific DMRS demodulation may be used. In an embodiment, the receive processing may include the computation of the linear combining weight $W_k$, further applying $D_k$ complex gain per stream, as well as the modulo operation. In an embodiment, if it is assumed that a MRC receiver is applied at the UE side, the linear combining $W_k$ may be obtained by measuring the Tx effective/beamformed channel $H_{k,\mathit{eff}}^{Tx-Rx} = H_k F_k$, i.e., ECH1, according to equation 3 via DMRS1 which is linearly precoded with $F_k$.

In some embodiments, to apply the complex gain $D_k \in \mathbb{C}^{r_k \times r_k}$ per stream, a UE may measure the non-linearly precoded equivalent channel $\overline{H}_k = H_{k,\mathit{eff}}^{Tx-Rx} P_k$, i.e., ECH2, via DMRS2, which is linearly precoded by $P_k$ and $F_k$ successively, where $H_{k,\mathit{eff}}^{Tx-Rx}$ corresponds to the Tx-Rx effective/beamformed channel for the UE k. According to one embodiment, for the scheduled UE(s), the end-to-end equivalent channel $\overline{H} = H_{\mathit{eff}}^{Tx-Rx} P$ is a lower triangular matrix L. As a result, the scalar weighting coefficients per stream may be obtained as the diagonal elements of $D = \mathrm{diag}\{D_1, \ldots, D_K\} = \mathrm{diag}\{\overline{H}^{-1}(1,1), \ldots, \overline{H}^{-1}(r,r)\}$, where $\overline{H}(i,i)$ takes the diagonal element of the lower-triangular matrix $\overline{H}$.

Figure 6A:
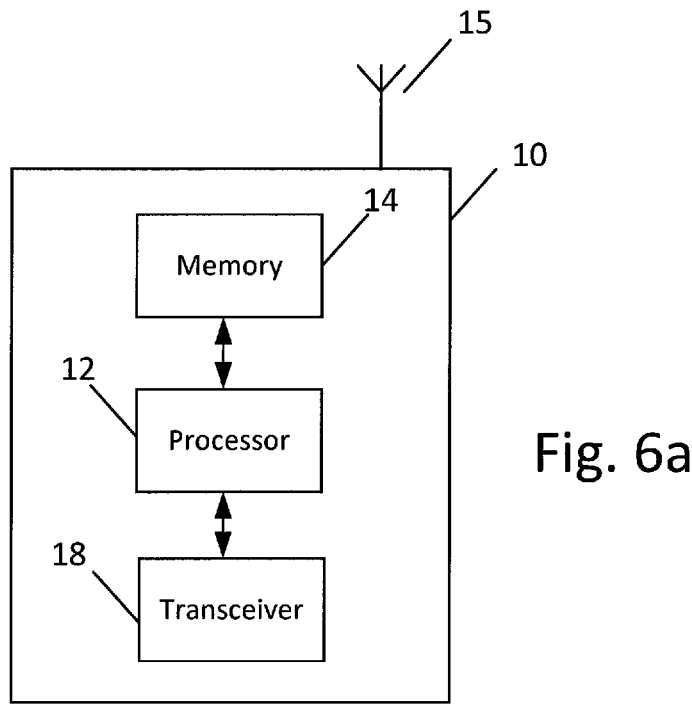
FIG. 6a illustrates an example block diagram of an apparatus, according to one embodiment.

FIG. 6a illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), Node B or access point, next generation Node B (NG-NB or gNB), WLAN access point, mobility management entity (MME), and/or subscription server associated with a radio access network, such as a GSM network, LTE network, 5G or NR.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. It should be noted that one of ordinary skill in the art would understand that apparatus 10 may include components or features not shown in FIG. 6a.

As illustrated in the example of FIG. 6a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 6a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein, such as the flow, signaling or block diagrams illustrated in FIGS. 1-5. For example, in certain embodiments, apparatus 10 may be controlled by memory 14 and processor 12 to perform one or more of the steps performed by the gNB illustrated in FIGS. 1-5. In certain embodiments, apparatus 10 may be configured to perform an efficient non-linear precoding procedure that may include combined or concatenated linear and non-linear precoding, for example based on explicit CSI feedback from UE(s), and according to a dual DMRS structure for demodulation of data that undergoes both non-linear and linear precoding.

For instance, in some embodiments, apparatus 10 may be controlled by memory 14 and processor 12 to send unprecoded CSI-RS or beamformed CSI-RS to one or more UE(s). According to one embodiment, apparatus 10 may be controlled by memory 14 and processor 12 to receive specific CSI from the UE(s). Optionally, in certain example embodiments, apparatus 10 may be controlled by memory 14 and processor 12 to also receive at least one of CQI, RI, and/or PMI from the UE(s). In an embodiment, apparatus 10 may be controlled by memory 14 and processor 12 to concatenate linear and non-linear precoding, based on the specific CSI acquisition received from the UE(s), and to generate two types of DMRS for the concatenated linear and non-linear precoding. According to some embodiments, one of the two types of DMRS is linearly precoded with one linear precoding matrix from the first-stage linear precoder and the other one of the two types of DMRS is linearly precoded with both the first-stage linear precoder and a feedforward filter in a second-stage non-linear precoder from the concatenation of linear and nonlinear precoders. In one embodiment, apparatus 10 may be controlled by memory 14 and processor 12 to multiplex the two types of DMRS with data, and to transmit, to the UE(s), PDSCH including at least the two types of DMRS and the data to the UE(s).

In some embodiments, the CSI may include one or more of: (a) a combination of channel quality indicator (CQI), rank indicator (RI), and explicit transmit channel covariance; (b) a combination of channel quality indicator (CQI), rank indicator (RI), precoding matrix indicator (PMI), and explicit effective/beamformed channel; or (c) channel quality indicator (CQI), rank indicator (RI), precoding matrix indicator (PMI), and the CSI directly estimated via transmit-receive beamformed uplink sounding based on reciprocity.

According to one embodiment, apparatus 10 may be further controlled by memory 14 and processor 12 to use PDCCH to include a specific DL indicator to inform the UE(s) that they are scheduled to be non-linearly precoded. In addition, in certain embodiments, apparatus 10 may be controlled by memory 14 and processor 12 to receive, from the UE(s), an indication of their capability of demodulating non-linearly precoded data. In certain embodiments, apparatus 10 may be further controlled by memory 14 and processor 12 to determine a precoding type, to calculate a linear precoding matrix for the UE(s), and to schedule the UE(s) for non-linear precoding.

Figure 6B:
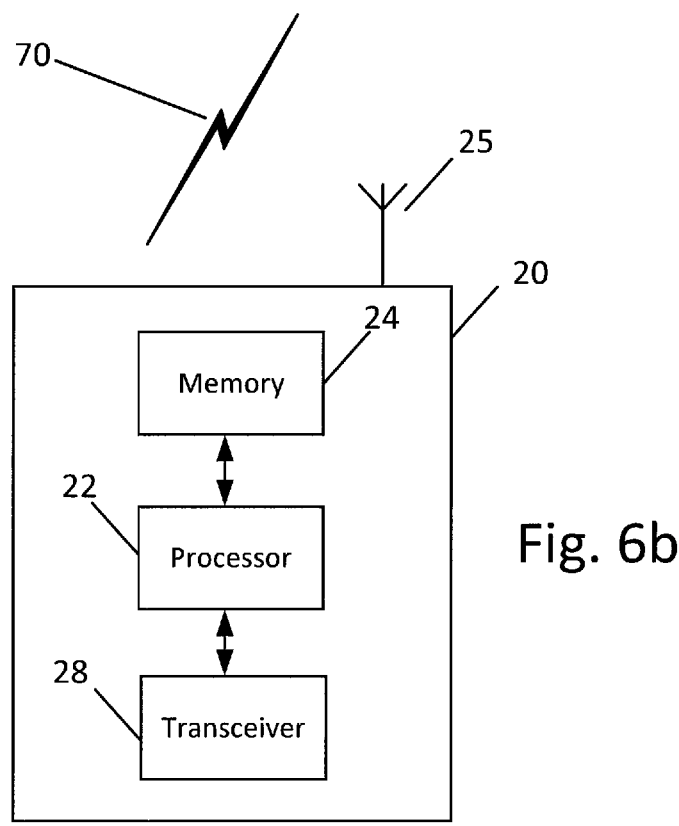
FIG. 6b illustrates an example block diagram of an apparatus, according to another embodiment.

FIG. 6b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown 2o in FIG. 6b.

As illustrated in the example of FIG. 6b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 10 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with embodiments described herein. For example, in some embodiments, apparatus 20 may be configured to perform one or more of the processes depicted in any of the flow charts or signaling diagrams described herein, such as the flow, signaling or block diagrams illustrated in FIGS. 1-5.

According to some embodiments, apparatus 20 may be controlled by memory 24 and processor 22 to support a network node (e.g., gNB) in specific CSI acquisition to generate two types of DMRS. For example, in certain embodiments, apparatus 20 may be controlled by memory 24 and processor 22 to receive unprecoded CSI-RS or beamformed CSI-RS from a network node (e.g., gNB). According to one embodiment, apparatus 20 may be controlled by memory 24 and processor 22 to transmit explicit CSI feedback to the network node. Optionally, in certain example embodiments, apparatus 20 may also be controlled by memory 24 and processor 22 to transmit at least one of its preferred CQI, RI, and/or PMI to the network node. In an example embodiment, the network node may construct a linear and non-linear precoder, and generate dual DMRS and data, based on the specific CSI acquisition.

In some embodiments, the CSI may include one or more of: (a) a combination of channel quality indicator (CQI), rank indicator (RI), and explicit transmit channel covariance; (b) a combination of channel quality indicator (CQI), rank indicator (RI), precoding matrix indicator (PMI), and explicit effective/beamformed channel; or (c) channel quality indicator (CQI), rank indicator (RI), precoding matrix indicator (PMI), and the CSI directly estimated via transmit-receive beamformed uplink sounding based on reciprocity.

According to one embodiment, apparatus 20 may be controlled by memory 24 and processor 22 to receive, for example on PDCCH, a specific DL indicator to inform the apparatus 20 that it is scheduled to be non-linearly precoded. According to certain embodiments, apparatus 20 may be controlled by memory 24 and processor 22 to send, to the network node, an indication of the capability of apparatus 20 to demodulate non-linearly precoded data. In some embodiments, apparatus 20 may be controlled by memory 24 and processor 22 to receive, for example on PDSCH, at least the dual DMRS including two types of DMRS and the data from the network node.

According to an embodiment, apparatus 20 may be further controlled by memory 24 and processor 22 to estimate two equivalent channels using the received dual DMRS and to demodulate the data. In an embodiment, apparatus 20 may be further controlled by memory 24 and processor 22 to concatenate linear and non-linear receivers based on the dual DMRS, to demodulate the data. In certain embodiments, apparatus 20 may be further controlled by memory 24 and processor 22 to estimate UE receive weights per stream using a first of the two types of DMRS (DMRS1) that is used for linear receive combining, to combine antenna ports at the apparatus to form the per stream output, and to equalize the per stream output with channel estimates obtained using a second type of the two types of DMRS (DMRS2) that is used for non-linearly precoded data (e.g., the second type of DMRS (DMRS2) may be used for scaling and phase de-rotation of the non-linearly precoded data). Thus, in certain embodiments, apparatus 20 may be controlled by memory 24 and processor 22 to use the first type of DMRS (DMRS1) to estimate a first CSI and obtain receive combining weights, and to use the second type of DMRS (DMRS2) to estimate a second CSI and obtain scaling weights. In an embodiment, apparatus 20 may then be controlled by memory 24 and processor 22 to detect and demodulate the data.

Figure 7A:
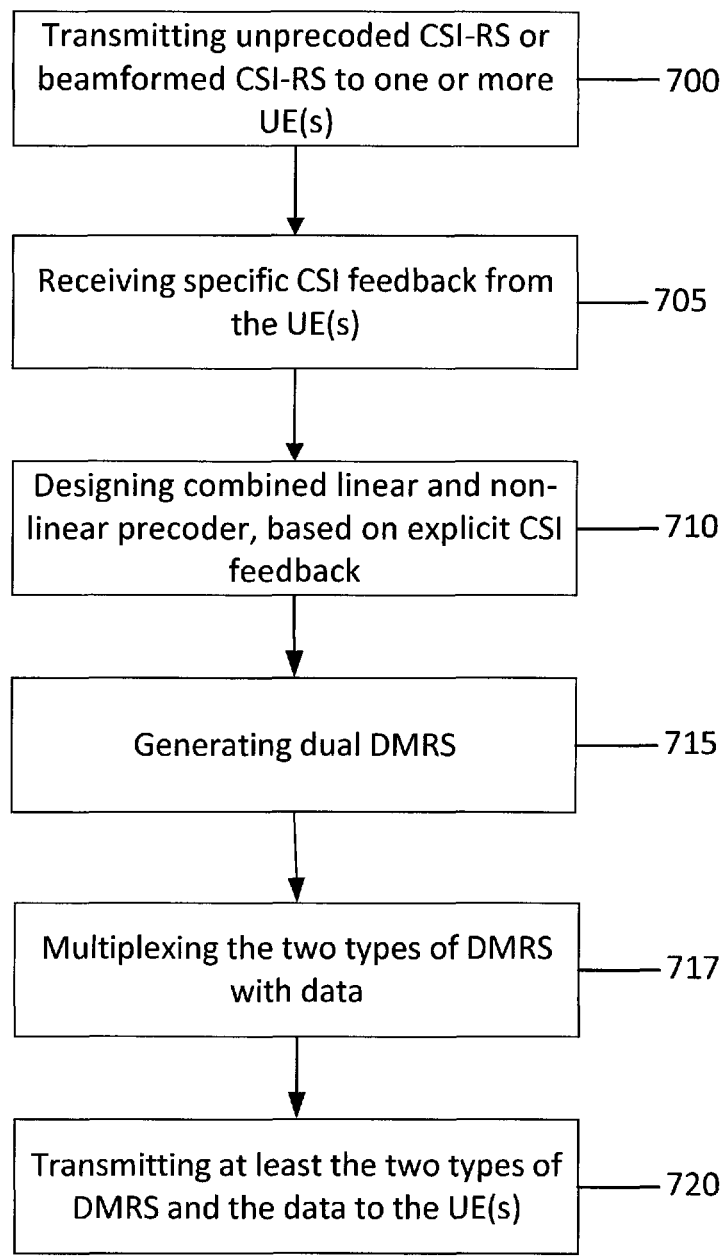
FIG. 7a illustrates an example flow diagram of a method, according to one embodiment.

FIG. 7a illustrates an example flow diagram of a method for non-linear precoding, according to one embodiment. In certain embodiments, the flow diagram of FIG. 7a may be performed by a network node, such as a base station, node B, eNB, gNB, or any other access node. As illustrated in the example of FIG. 7a, the method may include, at 700, transmitting unprecoded CSI-RS or beamformed CSI-RS to one or more UE(s). According to one embodiment, the method may also include, at 705, receiving specific CSI feedback from the UE(s). Optionally, in certain example embodiments, the method may also include receiving at least one of a preferred CQI, RI, and/or PMI from the UE(s). In an embodiment, the method may also include, at 710, designing combined linear and non-linear precoder, for example, by concatenating linear and non-linear precoding. The concatenating may be based on the specific CSI acquisition received from the UE(s). The method may include, at 715, generating two types of DMRS (i.e., dual DMRS) for the concatenated linear and non-linear precoding. According to some embodiments, one of the two types of DMRS is linearly precoded with one linear precoding matrix from a first-stage linear precoder, and the other one of the two types of DMRS is linearly precoded with both the first-stage linear precoder and a feedforward filter in a second-stage non-linear precoder from the concatenation of linear and non-linear precoders. In one embodiment, the method may include, at 717, multiplexing the two types of DMRS with data, and, at 720, transmitting PDSCH including at least the two types of DMRS and the data to the UE(s).

In some embodiments, the CSI may include one or more of: (a) a combination of channel quality indicator (CQI), rank indicator (RI), and explicit transmit channel covariance; (b) a combination of channel quality indicator (CQI), rank indicator (RI), precoding matrix indicator (PMI), and explicit effective/beamformed channel; or (c) channel quality indicator (CQI), rank indicator (RI), precoding matrix indicator (PMI), and transmit-receive beamformed uplink sounding based on reciprocity.

According to one embodiment, the method may optionally include using PDCCH to include a specific DL indicator to inform the UE(s) that they are scheduled to be non-linearly precoded. In addition, in certain embodiments, the method may include receiving, from the UE(s), an indication of their capability of demodulating non-linearly precoded data. In certain embodiments, the method may include determining a precoding type, calculating a linear precoding matrix for the UE(s), and scheduling the UE(s) for non-linear precoding.

Figure 7B:
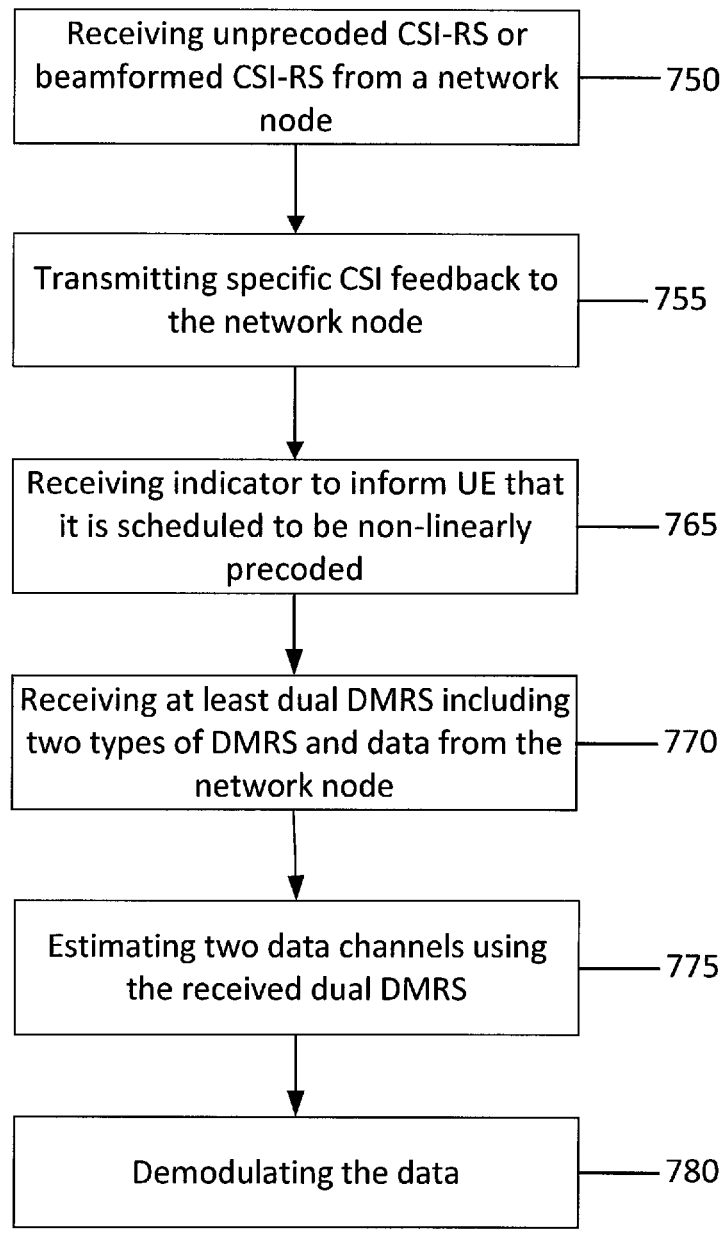
FIG. 7b illustrates an example flow diagram of a method, according to another embodiment.

FIG. 7b illustrates an example flow diagram of a method for non-linear precoding, according to one embodiment. In certain embodiments, the flow diagram of FIG. 7b may be performed, for example, by a UE, mobile station, mobile equipment, IoT device, or the like. As illustrated in the example of FIG. 7b, the method may include, at 750, receiving unprecoded CSI-RS or beamformed CSI-RS from a network node (e.g., gNB). According to one embodiment, the method may include supporting a network node in specific CSI acquisition to generate two types of DMRS that may include, at 755, transmitting the specific CSI feedback to the network node. Optionally, in certain example embodiments, the method may include transmitting at least one of the UE's preferred CQI, RI, and/or PMI to the network node. In an example embodiment, the network node may then construct a linear and non-linear precoder, and generate dual DMRS and data, based on the explicit CSI feedback.

In some embodiments, the CSI may include one or more of: (a) a combination of channel quality indicator (CQI), rank indicator (RI), and explicit transmit channel covariance; (b) a combination of channel quality indicator (CQI), rank indicator (RI), precoding matrix indicator (PMI), and explicit effective/beamformed channel; or (c) channel quality indicator (CQI), rank indicator (RI), precoding matrix indicator (PMI), and transmit-receive beamformed uplink sounding based on reciprocity.

According to one embodiment, the method may also include, at 765, receiving, for example on PDCCH, a specific DL indicator to inform the UE that it is scheduled to be non-linearly precoded. According to certain embodiments, the method may also include sending, to the network node, an indication of the capability of the UE to demodulate non-linearly precoded data. In some embodiments, the method may further include, at 770 receiving, for example on PDSCH, at least the dual DMRS including two types of DMRS and the data from the network node.

According to an embodiment, the method may also include, at 775, estimating two equivalent channels using the received dual DMRS and, at 780, demodulating the data. The method may also include concatenating linear and non-linear receivers based on the dual DMRS, to demodulate the data. In certain embodiments, the estimating 775 may include estimating UE receive weights per stream using a first of the two types of DMRS (DMRS1) that is used for linear receive combining, combining antenna ports at the UE to form the per stream output, and to equalize the per stream output with channel estimates obtained using a second type of the two types of DMRS (DMRS2) that is used for non-linearly precoded data (e.g., the second type of DMRS (DMRS2) may be used for scaling and phase de-rotation of the non-linearly precoded data). Thus, in certain embodiments, the method may include using the first type of DMRS (DMRS1) to estimate a first equivalent channel (ECH1) and obtaining receive combining weights, and using the second type of DMRS (DMRS2) to estimate a second equivalent channel (ECH2) and obtain scaling weights. In an embodiment, the demodulating 780 may include detecting and demodulating the data.

Therefore, embodiments of the invention provide several technical improvements, enhancements, and/or advantages. Various example embodiments provide a CSI acquisition procedure that facilitates precoding design for the large antenna array. Some embodiments also provide explicit CSI with sufficient resolution to ensure the robust performance of non-linear precoding. Further, as a result of certain embodiments, network throughput and UE throughput performance are enhanced. In addition, MU MIMO performance is improved. Indeed, simulation results have shown that implementing non-linear precoding procedures according to embodiments described herein results in better performance than linear precoding procedures, and therefore results in improved cell throughput and UE throughput. As such, embodiments of the invention can improve performance and throughput of networks and network nodes including, for example, access points, base stations/eNBs/gNBs, and mobile devices or UEs. Accordingly, the use of embodiments of the invention result in improved functioning of communications networks and their nodes.

In some embodiments, the functionality of any of the methods, processes, signaling diagrams, algorithms or flow charts described herein may be implemented by software and/or computer program code or portions of code stored in memory or other computer readable or tangible media, and executed by a processor.

In some embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A method, comprising:

concatenating, by a network node, of linear and non-linear precoding, wherein the concatenating comprises concatenating the linear and non-linear precoding based on specific channel state information acquisition from at least one user equipment;

generating two types of demodulation reference signals for the concatenated linear and non-linear precoding, wherein one of the two types is linearly precoded with one linear precoding matrix from a first-stage linear precoder, used for linear receive combining, and another one of the two types is linearly precoded with both the first-stage linear precoder and a feedforward filter in a second-stage non-linear precoder from the concatenation of linear and nonlinear precoders, used for scaling and phase de-rotation of the non-linearly precoded data; and multiplexing, by the network node, the two types of demodulation reference signals with data;

determining a precoding type;

calculating a linear precoding matrix based on the specific channel state information acquisition for the at least one user equipment;

scheduling the at least one user equipment for non-linear precoding; and designing non-linear precoding based on the specific channel state information acquisition.

2. The method according to claim 1, further comprising transmitting physical downlink shared channel comprising at least the two types of demodulation reference signals and the data to the at least one user equipment.

3. The method according to claim 1, wherein precoding matrices to generate demodulation reference signals requires specific channel state information acquisition, the specific channel state information acquisition comprises at least one of:

reporting a combination of channel quality indicator (CQI), rank indicator (RI), and explicit transmit channel covariance;

reporting a combination of channel quality indicator (CQI), rank indicator (RI), precoding matrix indicator (PMI), and explicit effective/beamformed channel; or reporting channel quality indicator (CQI), rank indicator (RI), precoding matrix indicator (PMI), and estimating the explicit channel directly via transmit-receive beamformed uplink sounding based on reciprocity.

4. The method according to claim 1, further comprising using physical downlink control channel comprising a specific downlink indicator to inform the at least one user equipment that they are scheduled to be non-linearly precoded.

5. The method according to claim 1, further comprising receiving, from the at least one user equipment, an indication of their capability of demodulating non-linearly precoded data.

6. An apparatus, comprising:
at least one processor; and
at least one memory comprising computer program code,
the at least one memory and computer program code configured, with the at least one processor, to cause the apparatus at least to
concatenate linear and non-linear precoding, wherein the concatenating comprises concatenating the linear and non-linear precoding based on specific channel state information acquisition from at least one user equipment;
generate two types of demodulation reference signals for the concatenated linear and non-linear precoding,
wherein one of the two types is linearly precoded with one linear precoding matrix from a first-stage linear precoder, used for linear receive combining, and another one of the two types is linearly precoded with both the first-stage linear precoder and a feedforward filter in a second-stage non-linear precoder from the concatenation of linear and nonlinear precoders, used for scaling and phase de-rotation of the non-linearly precoded data; and
multiplex the two types of demodulation reference signals with data;
determine a precoding type;
calculate a linear precoding matrix based on the specific channel state information acquisition for the at least one user equipment;
schedule the at least one user equipment for non-linear precoding; and
design non-linear precoding based on the specific channel state information acquisition.

7. The apparatus according to claim 6, wherein the at least one memory and computer program code are further configured, with the at least one processor, to cause the apparatus at least to transmit physical downlink shared channel comprising at least the two types of demodulation reference signals and the data to the at least one user equipment.

8. The apparatus according to claim 6, wherein the channel state information comprises at least one of:
a combination of channel quality indicator (CQI), rank indicator (RI), and explicit transmit channel covariance;
a combination of channel quality indicator (CQI), rank indicator (RI), precoding matrix indicator (PMI), and explicit effective/beamformed channel; or
channel quality indicator (CQI), rank indicator (RI), precoding matrix indicator (PMI), and the channel estimated via transmit-receive beamformed uplink sounding based on reciprocity.

9. The apparatus according to claim 6, wherein the at least one memory and computer program code are further configured, with the at least one processor, to cause the apparatus at least to use physical downlink control channel comprising a specific downlink indicator to inform the at least one user equipment that they are scheduled to be non-linearly precoded.

10. The apparatus according to claim 6, wherein the at least one memory and computer program code are further configured, with the at least one processor, to cause the apparatus at least to receive, from the at least one user equipment, an indication of their capability of demodulating non-linearly precoded data.

11. A method, comprising:
supporting a network node in specific channel state information acquisition to generate two types of demodulation reference signals;
receiving, from the network node, dual demodulation reference signals comprising the two types of demodulation reference signals and data;
estimating two equivalent channels using the dual demodulation reference signals and demodulating the data;
concatenating, by a user equipment, linear and non-linear receivers based on the dual demodulation reference signals, to demodulate the data;
estimating user equipment receive weights per stream using a first of the two types of demodulation reference signals that is used for linear receive combining;
combining antenna ports at the user equipment to form the per stream output; and
equalizing the per stream output with channel estimates obtained using a second type of the two types of demodulation reference signals that is used for non-linearly precoded data.

12. The method according to claim 11, further comprising receiving an indication that the user equipment is scheduled to be non-linearly precoded.

13. An apparatus, comprising:
at least one processor; and
at least one memory comprising computer program code,
the at least one memory and computer program code configured, with the at least one processor, to cause the apparatus at least to
support a network node in specific channel state information acquisition to generate two types of demodulation reference signals;
receive, from the network node, dual demodulation reference signals comprising the two types of demodulation reference signals and data;
estimate two equivalent channels using the dual demodulation reference signals and demodulating the data; and
concatenate linear and non-linear receivers based on the dual demodulation reference signals, to demodulate the data;
estimate user equipment receive weights per stream using a first of the two types of demodulation reference signals that is used for linear receive combining;
combine antenna ports at the apparatus to form the per stream output; and
equalize the per stream output with channel estimates obtained using a second type of the two types of demodulation reference signals that is used for non-linearly precoded data.

14. The apparatus according to claim 13, wherein the at least one memory and computer program code are further configured, with the at least one processor, to cause the apparatus at least to receive an indication that the apparatus is scheduled to be non-linearly precoded.

* * * * *